United States Patent [19]

Stella et al.

[11] 4,323,287

[45] Apr. 6, 1982

[54] BEARING SEAL

[75] Inventors: Leo Stella, Bristol; America E. Marola, Torrington, both of Conn.

[73] Assignee: The Torrington Company, Torrington, Conn.

[21] Appl. No.: 81,524

[22] Filed: Oct. 3, 1979

[51] Int. Cl.³ .............................................. F16C 33/78
[52] U.S. Cl. .................................. 308/187.1; 308/36.1
[58] Field of Search ..................... 308/187.1, 187, 36.1, 308/187.2, 36.2; 277/215, 29, 207 R, 152, 153

[56] References Cited

U.S. PATENT DOCUMENTS

| | | | |
|---|---|---|---|
| 3,341,264 | 9/1967 | Otto | 308/187.1 |
| 3,685,838 | 8/1972 | Malmstrom | 308/187.1 |
| 3,955,859 | 5/1976 | Stella et al. | 308/36.1 |
| 4,094,516 | 6/1978 | Morley et al. | 277/215 |

*Primary Examiner*—Lenard A. Footland
*Attorney, Agent, or Firm*—Frank S. Troidl

[57] ABSTRACT

The annular seal is located in the annular space between a first member and a second member of a bearing. The seal has an annular lip portion normally in contact with one of the members around the entire circumference of the seal to keep lubricant in the annular space behind the annular seal. The seal has protrusions behind that portion of the lip which contacts the member and at circumferentially spaced locations on the annular seal. The protrusions are adapted to keep the back portion of the annular seal adjacent each side of the protrusions spaced from the member the lip contacts.

2 Claims, 4 Drawing Figures

BEARING SEAL

This invention relates to bearings; more particularly, this invention is a bearing seal.

With many bearings which have a lubricant, new lubricant must often be added periodically. With conventional bearings which include a lip seal, it often happens that the seal lip will not open to allow a grease or other lubricant purge. As a result, the lubrication pressure builds up and eventually pops the seal out of the outer member groove.

This invention is an annular seal which has, in addition to the normal lip, several small protrusions which are integral with the lip. The protrusions prevent the seal lip from flattening against the sealing surface in the area on each side of the protrusion. Thus, the lubricant is easily purged past the seal lip.

Briefly described, the invention includes a bearing with a first member and a second member with an annular space between them. An annular lip seal extends across the annular space with the lip of the seal in contact wit either the first member or the second member. A plurality of circumferentially spaced protrusions are adapted to keep the back portion of the annular seal adjacent each side of the protrusion spaced from the member contacted by the lip.

The invention, as well as its many aadvantages, may be further understood by reference to the following detailed description and drawings in which.

In the various figures, like parts are referred to by like numbers.

The invention to be described herein is particularly useful in a cam follower type bearing and will be described in detail with regard to its use in a cam follower. However, this system can be used in other bearing types which employ lubricating systems.

Figure 1:
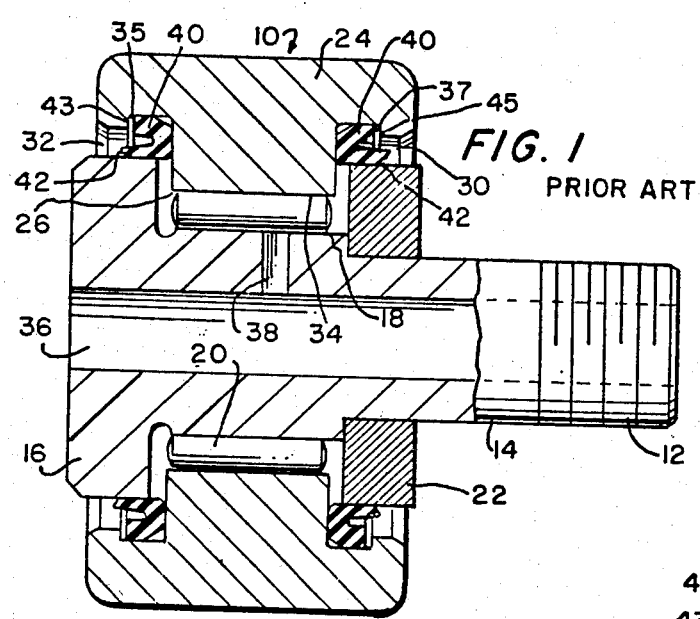
FIG. 1 is a sectional view of a cam follower type bearing known in the art.

Referring to the drawings, FIG. 1 shows a prior art roller bearing cam follower 10 with a threaded portion 12 at one end of the stud or inner race 14 so that the entire bearing may be secured to a suitable arm for transmitting motion. Stud 14 has an integral flange portion 16 at one end thereof and adjacent this flange there is a bearing surface 18 having a reduced diameter from the outside diameter of flange portion 16 and acting as the inner raceway of the bearing. A plurality of rollers 20 are disposed about the stud 14 on the bearing surface 18 and the rollers are axially retained in position by the end flange 16 and an annular end plate or retainer plate 22. The end plate is secured with the stud surface and has substantially the same outer diameter as the flange 16.

An outer member 24 has a bore 26 and counter bores 30 and 32 in its axial ends. The raceways 34 of the outer member 24 is positioned lengthwise between counter bore 35 of greater diameter than counter bore 32 and counter bore 37 of greater diameter than counter bore 30.

Lubrication for the rollers 20 is provided through the longitudinal lubrication duct 36 which extends through the center of the stud 14 and which is in communication with the outer bearing surface 18 of the inner race by means of a radial bore 38. A space defined by the raceway 34 on the outer member 24 and the raceway 18 on the inner member or stud 14 forms the annular lubricating hold space in which the rollers are located.

In FIG. 1, conventional lip seals 40 are shown positioned in the counter bores 35 and 37 with the lips 42 in contact with the flang 16 of the inner member and retainer plate 22. The seals are kept in position by annular shoulders 43 and 45. It often happens that when it is desired to purge the lubricant from the annular lubricating space, by flowing lubricant through longitudinal bore 36, radial bore 38, and along the annular space between the inner member 14 and the outer member 24 and against the backs of the annular seals 40, the lips 42 do not separate from the flange 16 or retainer plate 22 and the pressure built up behind the annular seal 40 causes the annular seal to rupture or causes the seal to be forced under shoulder 43 or shoulder 45 at least at one point, thus destroying the sealing function.

Figure 2:
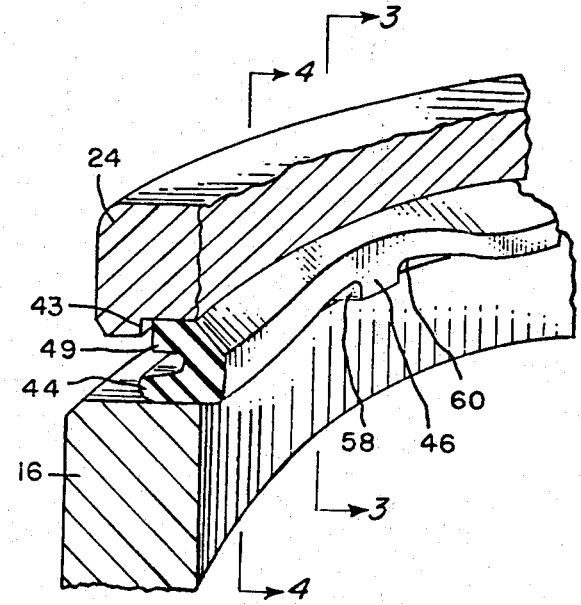
FIG. 2 is a fragmentary perspective view of a cam follower showing our new bearing seal.
Figure 4:
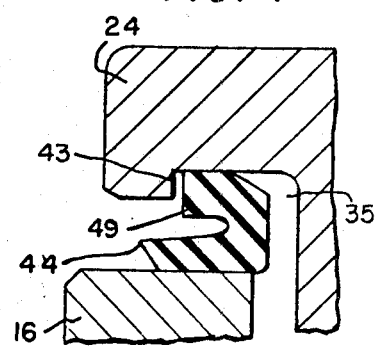
FIG. 4 is a sectional view on an enlarged scale taken along lines 4—4 of FIG. 2 and in the direction of the arrows.

FIG. 2 shows the new bearing and annular seal of this invention. Though only one new seal is described in detail, it is to be understood that a second new seal of the same or similar structure may be included in a cam follower such as shown in FIG. 1. The annular seal 49 has an annular lip portion 44 which is normally in contact with one of the race members such as flange 16 of inner race member 14. The lip 44 is in contact with the flange around the entire circumference of the seal to keep lubricant in the annular space between the inner member 14 and the outer member 24 behind the annular seal 49.

A plurality of circumferentially spaced protrusions 46 (only one shown in FIG. 2) are located behind the lip portion. The protrusions may be spaced, for example, every 90 degrees around the circumference in which case there will be four protrusions 46.

Figure 3:
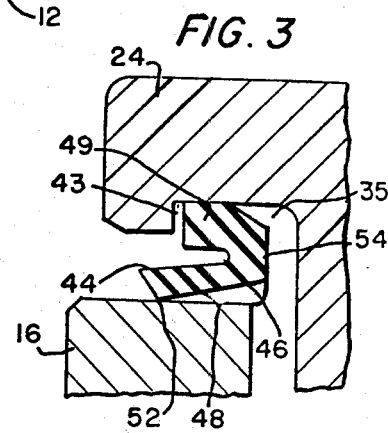
FIG. 3 is a sectional view on an enlarged scale taken along lines 3—3 of FIG. 2 and in the direction of the arrows.

The entire length of the base 48 of each protrusion 46 is in contact with the flange 16. In the embodiment shown, the protrusion is in the shape of a wedge with the height of the wedge continuously increasing from the front 52 (see FIG. 3) of the lip 44 toward the back end 54 of the annular seal 49.

The wedges 46 keep the back portion of the annular seal adjacent each side of the wedge spaced from the flange 16. The spaces adjacent each side of the wedge 46 are identified by numerals 58 and 60 in FIG. 2.

The invention overcomes the problem of the seal flattening down and not allowing the lubricant to purge past. The integral wedges provide several areas where the lubricant can enter in. Then, when the hydraulic pressure in the bearing from regreasing builds up, the hydraulic pressure in the radial exterior part of the seal is less than the hydraulic pressure in the radially inner part of the seal along side the wedges and the seal lip will open and allow the grease to pass through. The pressure can no longer build up high enough to blow the seal out of the bearing assembly.

We claim:

1. In a bearing having a first member and a second member with an annular space between said first member and said second member: an annular seal extending across said annular space, said annular seal having an annular lip portion normally in contact with one of said members around the entire circumference of the seal to keep lubricant in the annular space between said first member and said second member behind said annular seal, the annular seal having radial protrusions located behind the lip portion in contact with said one member and at circumferentially spaced locations on the annular seal, said protrusions being in contact with the same member as the lip and adapted to keep the back portion of the annular seal adjacent each side of the protrusion spaced from the member the lip contacts.

2. A seal in accordance with claim 1 wherein the protrusions are wedge-shaped with the height of the wedge continuously increasing from the front of the lip portion toward the back end of the seal.

* * * * *